(12) United States Patent
Strasmann (10) Patent No.: US 9,352,400 B2
(45) Date of Patent: May 31, 2016

(54) SHANK DRILL

(71) Applicant: JOERG GUEHRING, Albstadt (DE)

(72) Inventor: Martin Strasmann, Remscheid (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 14/606,186

(22) Filed: Jan. 27, 2015

(65) Prior Publication Data

US 2015/0158095 A1 Jun. 11, 2015

Related U.S. Application Data

(63) Continuation of application No. 13/628,370, filed on Sep. 27, 2012, now abandoned, which is a continuation of application No. 12/533,269, filed on Jul. 31, 2009, now abandoned.

(30) Foreign Application Priority Data

Mar. 7, 2009 (DE) .......................... 10 2009 012 012
Apr. 29, 2009 (DE) .......................... 10 2009 002 738

(51) Int. Cl.
*B23C 5/00* (2006.01)
*B23C 5/10* (2006.01)

(52) U.S. Cl.
CPC . *B23C 5/10* (2013.01); *B23C 5/003* (2013.01); *B23C 2210/0485* (2013.01);
(Continued)

(58) Field of Classification Search
CPC ............... B23C 2210/0485; B23C 2210/0492; B23C 2210/282; B23C 5/10
See application file for complete search history.

(56) References Cited

U.S. PATENT DOCUMENTS 3,736,634 A * 6/1973 Sonnie ...................... B23C 5/10
407/54
4,174,915 A * 11/1979 Peetz ........................ B23C 5/10
407/59
(Continued)

FOREIGN PATENT DOCUMENTS

DE          37 06 282 A1    9/1987
DE          297 15 192 U1   11/2000
(Continued)

OTHER PUBLICATIONS

Guhring, Handbuch-Wer bietet mehr?, Ausgabe Deutsch 2006, Preisliste NR 40, 3 pages.
(Continued)

*Primary Examiner* — Will Fridie, Jr.
(74) *Attorney, Agent, or Firm* — Burr & Brown, PLLC (57) ABSTRACT

A shank cutter has plural circumferential cutting edges which run in a helical manner in the region of its cutting section and of which at least one critical number are equipped in each case with a preferably essentially flattened roughing profile with chip-separating grooves with rounded bases, so that the chip-separating grooves of cutter ridges which are adjacent in the circumferential direction are axially offset relative to each other. To create a tool which provides long service life by combined advantages of a vibration-stabilized finishing cutter and a conventional roughing cutter, at least one circumferential cutting edge has an angle of twist which differs from that of another circumferential cutting edge. In addition, the chip-separating grooves of the circumferential cutting edges which are equipped with a roughing profile in each case merge into a preferably essentially flattened central section of the roughing profile by means of a predefined flank radius.

19 Claims, 7 Drawing Sheets

(52) U.S. Cl.
CPC .. *B23C 2210/0492* (2013.01); *B23C 2210/086* (2013.01); *B23C 2210/088* (2013.01); *B23C 2210/282* (2013.01); *B23C 2210/486* (2013.01); *B23C 2220/60* (2013.01); *B23C 2250/16* (2013.01); *Y10T 407/1948* (2015.01); *Y10T 407/1958* (2015.01); *Y10T 409/303752* (2015.01)

(56) References Cited

U.S. PATENT DOCUMENTS

| | | | | | |
|---|---|---|---|---|---|
| 4,285,618 | A | * | 8/1981 | Shanley, Jr. | B23C 5/10 407/54 |
| 4,770,567 | A | * | 9/1988 | Moriarty | B23C 3/36 407/59 |
| 4,810,136 | A | * | 3/1989 | Paige | B23C 5/10 407/54 |
| 4,963,059 | A | * | 10/1990 | Hiyama | B23C 5/003 407/11 |
| 7,001,113 | B2 | * | 2/2006 | Flynn | B23C 5/10 407/54 |
| 7,367,754 | B1 | * | 5/2008 | Greenwood | B23C 5/10 407/59 |
| 7,377,732 | B2 | * | 5/2008 | Andoh | B23G 1/32 407/24 |
| 7,399,147 | B1 | * | 7/2008 | VanDyke, Jr. | B23C 5/003 407/53 |
| 8,007,209 | B2 | | 8/2011 | Maushart et al. | |
| 2008/0069650 | A1 | * | 3/2008 | Maushart | B23C 5/003 407/54 |
| 2010/0178119 | A1 | * | 7/2010 | Volokh | B23C 5/003 407/54 |
| 2010/0196108 | A1 | * | 8/2010 | Oka | B23C 5/10 407/54 |
| 2011/0013998 | A1 | * | 1/2011 | Tardivo | B23C 5/10 407/53 |

FOREIGN PATENT DOCUMENTS

| | | |
|---|---|---|
| DE | 20 2006 016 531 | 7/2007 |
| DE | 10 2008 018 399 | 10/2009 |
| EP | 0 062 693 | 10/1982 |
| EP | 1 894 655 A1 | 3/2008 |
| FR | 2 875 722 | 3/2006 |
| WO | 2008/018062 | 2/2008 |
| WO | 2008/052503 | 5/2008 |
| WO | 2009/122937 | 10/2009 |

OTHER PUBLICATIONS

Fa. Dormer, Produktkatalog 2009, 780 pages.
Screenshot zur Dokumenteneigenschaft des PDF-documents "v1tot", 1 page.
Fa. Rubig, Produktkatalog Mar. 2007, 236 pages.
Fa. Hommel Hercules zu Fräsertypen, 6 pages.
DIN 1836, Jan. 1984, 4 pages.
EP Communication and Notice of Opposition from a corresponding EP patent application, 40 pages.
International Search Report from a corresponding international patent application bearing a mailing date of Jul. 29, 2010, 8 pages.

* cited by examiner

SHANK DRILL

CROSS REFERENCE TO RELATED APPLICATIONS

This application is a continuation of U.S. patent application Ser. No. 13/628,370, filed Sep. 27, 2012, which is a continuation of U.S. patent application Ser. No. 12/533,269, filed Jul. 31, 2009, the entireties of which are incorporated herein by reference as if set forth in their entireties.

FIELD OF THE INVENTION

The invention relates to a shank cutter according to the preamble of Patent Claim 1.

BACKGROUND OF THE INVENTION

Such cutters have as a common feature a shank as the chucking part, which is inserted into the tool holder. Such cutters are used for example as slotting cutters or die-sinking cutters with a flat or round end. Such cutters are furthermore characterised in that they have a plurality of circumferential cutting edges in the region of their cutting section on the cutter ridges which are separated from each other by flutes, which cutting edges run in a helical manner and are in each case configured with a roughing profile in such a manner that the circumferential cutting edges are given chip-separating grooves, with the chip-separating grooves of cutter ridges which are adjacent in the circumferential direction being axially offset with respect to each other.

Such roughing profiles are standardised in "round" and "flat" versions for example in DIN 1836, with a differentiation being made between "extra coarse", "coarse" and "fine" with regard to the structure of the profile, where applicable with regard to the pitch with which the chip-separating grooves are introduced into the cutter ridges. The profile structure such as also these pitches of the recesses which form the chip-separating grooves, depends on the tool, with the pitch being selected to be finer with increasing hardness of the material to be machined. The pitch can furthermore be dependent on the tool diameter, with it being the case here that the smaller the diameter of the shank cutter, the finer the pitch.

In contrast to finishing cutters, which usually have no profiling of the cutting edge or face, the interrupted, that is, profiled profile of the tool cutting edge of the roughing cutter allows a more rapid breaking of the chip. The roughing cutter is however generally not suitable for the production of a uniform surface with a high surface quality. Owing to the short-chipping behaviour of the removed material, however, much better chip removal is produced than with the finishing cutter. Owing to the high material removal rate, roughing tools of the type mentioned at the start are also very suitable for work in which it is a matter of removing material as effectively and quickly as possible to a finishing level of for example 0.5 mm before a work step with a finishing tool. Also, the cutting pressure and the power consumption of the machine are lower when working with such roughing cutters, and the tool can produce a high cutting depth and cutting width.

On the other hand, finishing cutters, that is, shank cutters with smooth cutting edges, can produce a workpiece surface with high dimensional accuracy and quality, that is, smoothness, which is produced owing to the regularity of the tool cutting edge, the high speed with at the same time low feed rate of the cutting tool and the generally low chip volume owing to the low finishing level, which can be between 0.1 and 1.0 mm depending on the application. If such finishing tools are however used with greater cutting depths or widths, chip removal problems occur owing to the longer and larger chips and also the power consumption and the cutting pressure increase over-proportionately. In order to reduce the tendency to vibrate which arises thereby, the cutting edge geometry has been changed—as described for example in the document DE 37 06 282 C2—by working with at least two unequal angles of twist in the region of the circumferential cutting edges, that is, the main cutter edges.

These unequal angles of twist mean that vibrations of the cutting tool can be minimised, which can be used to increase the service life or conversely to increase the feed rate values. Owing to the comparatively high power consumption and the high cutting pressure as well as the critical chip removal as before, this known finishing cutter can also only be operated at relatively small cutting widths.

SUMMARY OF THE INVENTION

The invention is therefore based on the object of developing a shank cutter of the type described at the start, in particular according to the preamble of Patent Claim 1 in such a manner that it is in particular suitable for providing a high material removal rate and at the same time machining the workpiece with good surface quality while ensuring high tool life travel, low power consumption of the machine and reduced cutting pressure.

This object is achieved by the features of Patent Claim 1.

According to the invention, the measure of varying the angle of twist of the circumferential cutting edges which are at a circumferential distance from each other, which is known from the field of finishing cutters, is combined with a new geometry of the chip-separating grooves, as a result of which a cutting tool is produced which combines only the advantages of conventional roughing and finishing cutters with regard to chip formation, power consumption of the machine, cutting pressure, chip removal, the cutting width which can be achieved and the surface quality.

The shank cutter according to the invention produces short chips as before and therefore has a low power consumption. Furthermore, the cutting pressure is low, and good chip removal is produced owing to the short chips. Owing to the flattened roughing profile in connection with the measure of at least two circumferential cutting edges having different angles of twist, the tendency to vibrate of the cutter, which is normally pronounced because of the roughing profile, is considerably reduced, so that very high quality surfaces with a good tool life travel can be produced over the preferably essentially flattened regions of the roughing profile or with a roughing/finishing profile to DIN 1836, since the rounded portions of the chip-separating grooves in the transition to the preferably essentially flattened section of the roughing profile effectively ensure soft cutting with minimised impact loading of the circumferential cutting edges over the service life of the tool. The cutting tool according to the invention is in this manner particularly suitable for working with high cutting widths and depths, for example when cutting grooves, with the chip shape remaining as favourable as with pure rough-machining.

Advantageous developments of the invention are the subject of the dependent claims.

The shank cutter can in principle be equipped with any number of circumferential cutting edges. With more than three circumferential cutting edges or cutter ridges, it is advantageous according to Claim 2 to form the angles of twist of adjacent circumferential cutting edges differently in each case.

If an even number of circumferential cutting edges is provided, it is advantageous from a production standpoint to equip in each case two diametrically opposite circumferential cutting edges with the same angle of twist.

The different angles of twist of the circumferential cutting edges at the same time means that what is known as the pitch of the shank cutter, that is, the distribution of the circumferential cutting edges as seen in radial section, changes in the axial direction. It is advantageous according to Claim 4 to keep the pitch of the cutter equal in a radial plane which lies in the cutting section, in particular if the shank cutter is equipped with a cutting section of considerable axial length and the differences in the angles of twist are comparatively great. It is however equally possible to place this radial plane outside the cutting section, especially if the shank cutter according to the invention in any case produces very short chips and therefore is to be considered much less critical than a conventional finishing cutter with regard to chip removal.

It has been found that differences in the angle of twist in the range from 1 to 6° lead to particularly favourable chipping behaviour of the shank cutter, with it being possible for the value to depend on the material to be chipped and/or on the material of the shank cutter and/or on its coating.

Experiments have furthermore shown that it is advantageous to set the flank radius over which the chip-separating groove merges into the flattened section of the roughing profile in the range from 0.1 to 1.0 mm, particularly preferably from 0.1 to 0.5 mm, in order to maintain the required service life and specified surface quality.

Various production methods come into consideration for producing the chip-separating grooves. For example, it is possible to grind the chip-separating grooves into the circumferential cutting edges by means of a profile-grinding disc. According to one embodiment, the chip-separating grooves are angled towards a plane of the shank cutter which is perpendicular to a longitudinal axis of the shank cutter, as a result of which it is possible to influence chip formation in an advantageous manner. In this case the chip-separating grooves can in each case in sections follow the course of a helix, the lead of which corresponds to the pitch of the roughing profile or to a whole multiple of the pitch.

It is however equally possible to form the chip-separating grooves parallel to a plane of the shank cutter which is perpendicular to a longitudinal axis of the shank cutter.

According to a further advantageous configuration, the flank radius, which in each case faces the cutter shank is smaller in the chip-separating groove than the other flank radius, in particular in the case where the flank radius which faces the cutter shank first contributes to chip formation. With this measure, the service life of the shank cutter can be further increased, with it being possible at the same time for the vibration tendency to be reduced and the quality of the surface which can be produced thereby to be improved.

The chipping output, the surface quality and the service life of the tool can be further optimised by the choice of the material of the shank cutter. It has been found that the design according to the invention reveals its particular advantages if the tool as a whole or at least in the region of the cutting section is produced from a hard material, with for example solid hard metal, but also a cermet material being used as the hard material.

Depending on the field of use of the shank cutter, that is, depending on the chipping task, in particular depending on the material to be chipped, it can be advantageous to provide an internal coolant/lubricant supply system and/or a suitable coating. All customary hard material coatings, but also soft material coatings can be considered as coatings. In this regard, reference is made by way of example to the coatings described in the applicant's manual: "Gühring—Wer bietet mehr? [Gühring—Who offers more?]—German edition 2006, price list No. 40, on pages 1426 as "A layer or TiAlN layer", as "Super A layer", "C layer or TiCN layer", as "F layer", as "P layer (AlCrN layer)", as "S layer" or "TiN layer" or as "M layer based on MoS2".

BRIEF DESCRIPTION OF THE DRAWINGS

A plurality of exemplary embodiments of the invention are described in more detail below with the aid of schematic drawings. In the figures.

DETAILED DESCRIPTION OF THE INVENTION

Figure 1:
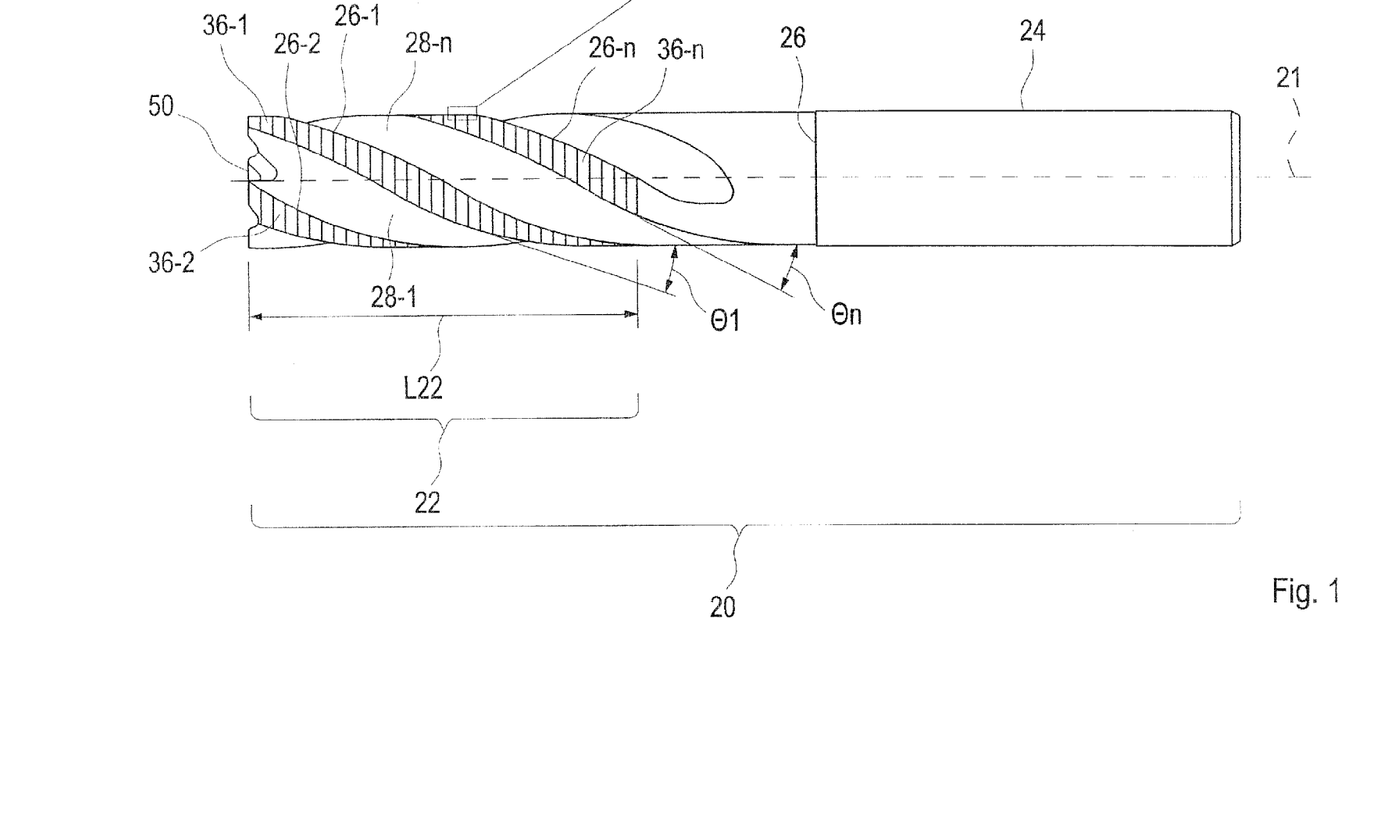
FIG. 1 shows a schematic side view of the shank cutter with four circumferential cutting edges.

In FIG. 1, a shank cutter is referred to with the reference symbol 20 and has a cutting section 22 and a clamping shank 24. The cutter axis is referred to with 21. In the example shown, both the cutting section and the clamping shank have a cylindrical configuration. The cutting section can however equally have a different envelope, for example an envelope in the shape of a cone surface.

The line 26 indicates that the shank cutter has what is known as a neck countersink, that is, the outer diameter of the clamping shank 24 is slightly bigger than the nominal diameter of the cutting section 22.

The cutting section 22 has a plurality of circumferential cutting edges 26-1 to 26-n, which run in a helical manner and between which flutes 28-1 to 28-n are formed. In this shank cutter the circumferential cutting edges are the main cutting edges. At the end face is formed a number of auxiliary cutting edges which corresponds to the number of circumferential cutting edges in a conventional manner so that a more detailed description of this geometry can be omitted here.

Figure 1A:
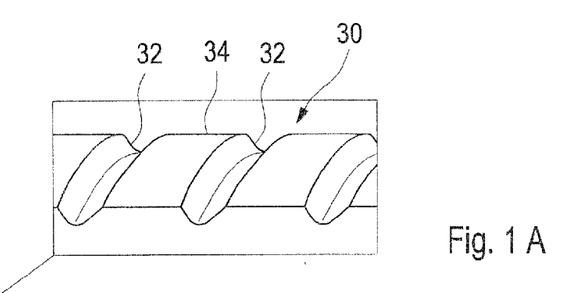
FIG. 1A shows detail "IA" in FIG. 1 in an enlarged illustration.

As can be seen in detail in FIG. 1A, the individual circumferential cutting edges are in the exemplary embodiment shown in each case equipped with a flattened roughing profile 30 which is formed by chip-separating grooves 32 and a flattened section 34 which lies between them. A central section can also be present instead of the flattened section, which central section follows a preferably slightly convex line as viewed in the longitudinal section of the cutter. The chip-separating grooves 32 extend in the exemplary embodiment shown over the entire width of the cutter ridges, which are referred to with 36-1 to 36-n, in such a manner that the chip-separating grooves of cutter ridges 26-1 and 26-2, 26-2 and 26-3, 26-n and 26-1 which are adjacent in the circumferential direction are axially offset with respect to each other so that the parts of material which are not cut by a circumferential cutting edge can be removed by the next cutting edge. The chipping thickness is in this manner doubled, so that according to Kienzle and Victor's machining principle the specific cutting force is reduced and the torque and the power consumption are less than with tools with a continuous circumferential cutting edge, that is, in finishing cutters.

Figure 2:
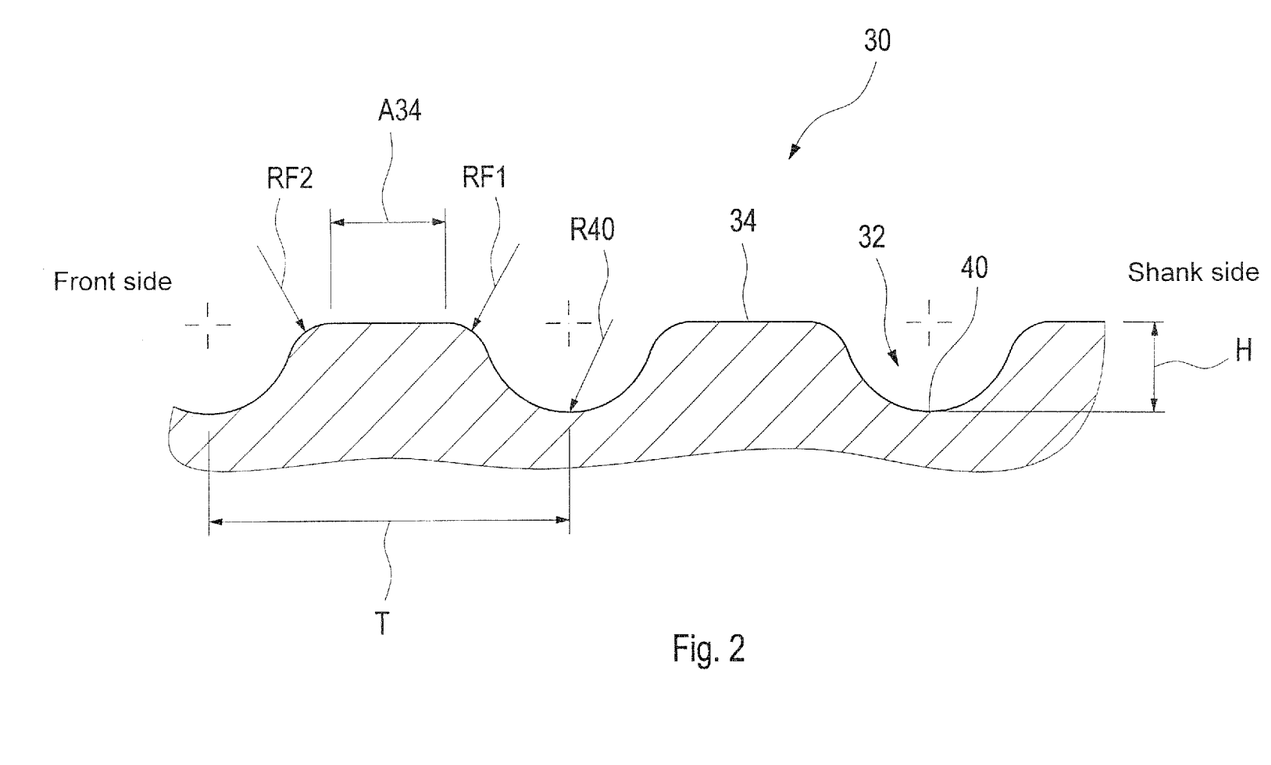
FIG. 2 shows a section of the roughing profile according to the invention in an enlarged illustration.

FIG. 2 shows schematically and on a greatly enlarged scale how the roughing profile 30 is equipped in detail in the shank cutter according to the invention. The individual chip-separating grooves 32 have a rounded groove base 40 with an extremely small radius R40. The chip-separating groove 32 merges into the flattened section 34 by means of a first flank radius RF1. The flank radius RF1 is on the side of the chip-separating groove 32 which faces away from the cutter shank 24. On the side which faces the cutter shank 24, the respective chip-separating groove 32 merges into the flattened section 34 of the roughing profile by means of a second flank radius RF2. The pitch of the roughing profile, that is, the axial distance between chip-separating grooves 32 of a circumferential cutting edge, is referred to with T and the depth of the roughing profile 30 is referred to with H.

The values RF1, RF2, T and H, and thus also the axial dimension A34 of the flattened section 34 are variable in order to carry out an adaptation to the chipping conditions, that is, to the material to be chipped, to the cutting speed and to the material removal rate. It has been found, however, that the following conditions are of particular advantage:

1. The flank radius RF1 and RF2 should be in the range from 0.1 to 1 mm, particularly preferably from 0.1 to 0.5 mm;
2. The size of the smallest radius RF40 in the base 40 of the chip-separating groove 32 should be greater than the flank radius RF1 or RF2;
3. The flank radius RF2, which leads during cutting in the direction of rotation, that is, in the cutting direction, of the shank cutter which has a right-handed twist in the embodiment according to FIG. 1, that is, the flank radius RF2, which faces the cutter shank, of the chip-separating groove, should be greater than the flank radius RF1 which faces away from the cutter shank. In other words, the flank radius which first does the cutting work when the roughing profile penetrates the workpiece should be greater than the other flank radius.

With this measure it is possible to keep the service life of the cutting edges and the surface quality of the machined workpiece surface at a very high level.

A further special feature of the shank cutter according to the invention can be seen in that the angle of twist, which referred to with θ1 to θn, of the circumferential cutting edges 26-1 to 26-n are different from each other, as follows:

In the most general case, at least one angle of twist θ differs from another angle of twist θ of the circumferential cutting edges.

According to an advantageous development, the angles of twist at least of adjacent circumferential cutting edges differ from each other.

In the embodiment of the shank cutter which is shown in the drawings, an even number of circumferential cutting edges 26-1 to 26-4 is provided, with in each case two diametrically opposite circumferential cutting edges 26-1 and 26-3, 26-2 and 26-4 having the same angle of twist θ. This can be seen best in FIG. 3. The circumferential cutting edge 26-1 on the cutter ridge 36-1 has for example an angle of twist θ1, which differs from the angle of twist θ2 of the adjacent circumferential cutting edge 26-2 by 1° to 6°, preferably by 1° to 3°. The angle of twist of the circumferential cutting edge 26-1 corresponds exactly to that of the circumferential cutting edge 26-3, and the angle of twist of the circumferential cutting edge 26-2 corresponds exactly to that of the circumferential cutting edge 26-4, The angle of twist θ can vary within wide limits and be for example in the range from 20° to over 50°, depending on the chipping task present in each case.

Figure 6:
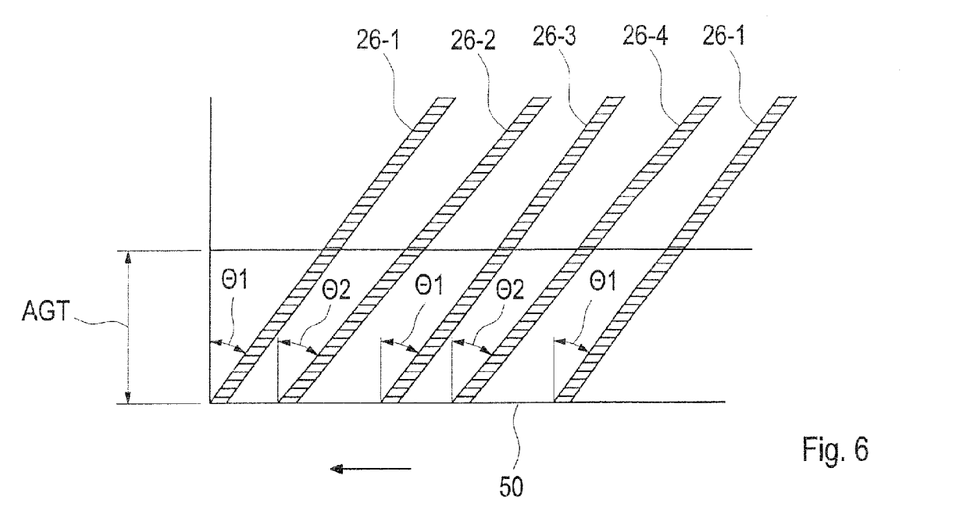
FIG. 6 shows a schematic winding of the shank cutter according to FIG. 3.

Using the winding according to FIG. 6, it can be explained how the pitch of the shank cutter changes owing to these differing angles of twist. It is assumed that the radial plane in which the cutter has an equal pitch is situated at a predefined distance AGT from the cutter end 50, that is, at which the circumferential distance of the circumferential cutting edges from each other is equal. In other words, the respective central angle between the adjacent circumferential cutting edges is 90°.

Figure 4:
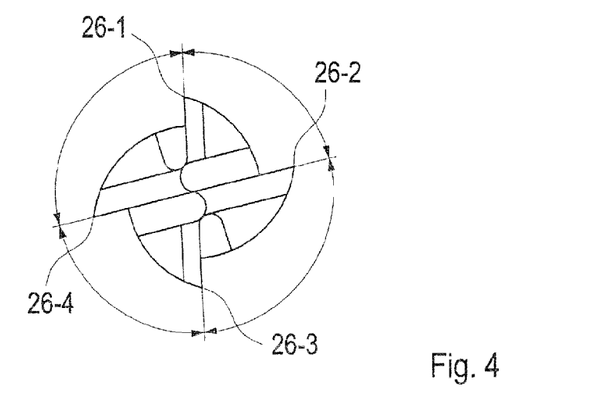
FIG. 4 shows the end view of the tool according to FIG. 3, looking along the arrow "IV"
Figure 5:
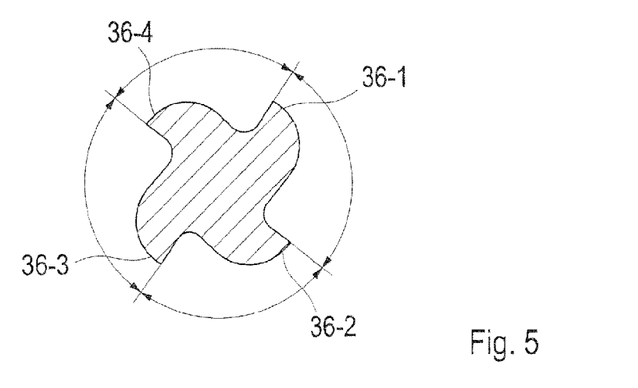
FIG. 5 shows the section according to V-V in FIG. 3 in an enlarged illustration.

Furthermore, if the angles of twist of circumferential cutting edges 26-1 and 26-3, 26-2 and 26-4 which lie diametrically opposite each other are equal but of different sizes, namely have the angle of twist θ1 or θ2, an unequal pitch is produced on the end face of the shank cutter—as shown in FIG. 4. In other words, the central angle between the adjacent circumferential cutting edges 26-1 and 26-2, 26-3 and 26-4 is less than 90°, whereas the other central angle is more than 90°.

Figure 3:
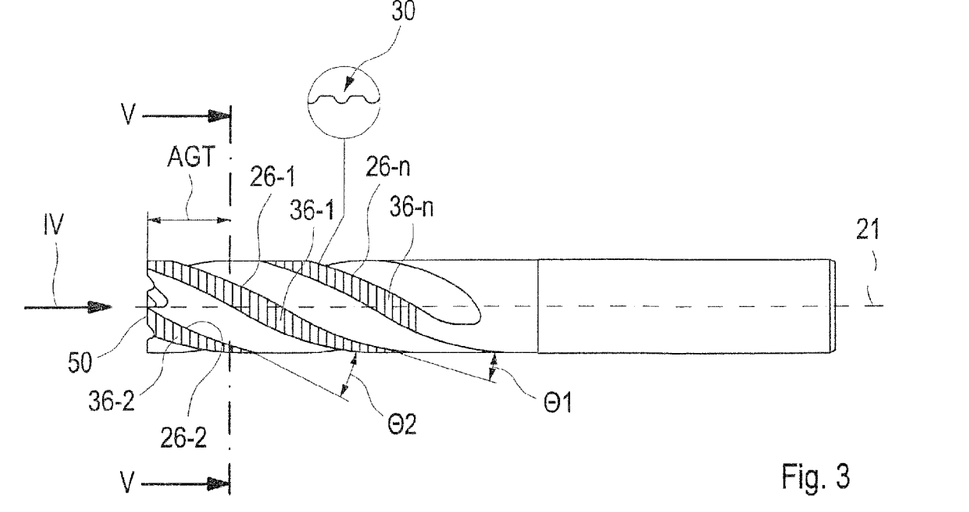
FIG. 3 shows a side view of the shank cutter in order to illustrate the position of the cross section on which the circumferential cutting edges are arranged with the same angular distance from each other.

The plane of section V-V in FIG. 3 is thus placed such that its axial distance from the cutter end corresponds to the dimension AGT. There is therefore an unequal pitch in all the other sectional planes perpendicular to the cutter axis 21.

It has been found to be advantageous if the dimension AGT is approximately 30% of the length L22 of the cutting section 22. It is however possible—depending on the field of application and use of the shank cutter and on the difference between the individual angles of twist θ1 to θn—to vary the dimension AGT within wide limits. It can even be possible, with a correspondingly small difference between the individual angles of twist of different or adjacent circumferential cutting edges, to make the dimension AGT greater than the dimension L22, and even to set it to be negative, that is, to place the radial plane of equal pitch outside the cutting section 22.

Figure 7:
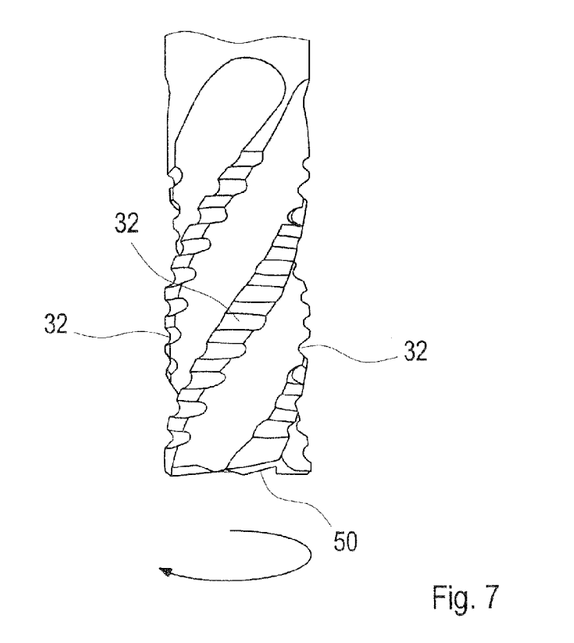
FIG. 7 shows a perspective side view of the shank cutter according to the invention.

FIG. 7 shows a perspective view of a shank cutter which has been tested in use. It can be seen in this figure that the chip-separating grooves 32 are introduced, preferably ground, in such a manner that they are slightly angled towards a plane, which is perpendicular to the cutter axis 21, of the shank cutter. This shape can be realised in that a profiled grinding disc is used to grind the chip-separating grooves, which grinding disc has a profile corresponding to the detail drawing according to FIG. 2, that is, an outer contour with the radii R40, RF1 and RF2. This grinding disc can be angled towards the plane, which is perpendicular to the cutter axis 21, of the shank cutter at a predefined angle, so that the profiled grinding disc can move along a helix, the lead of which corresponds to the pitch T of the roughing profile 30 with the chip-separating grooves 32.

Modified embodiments are shown in the other figures. In this case the components which correspond to the constituent parts of the above-described cutter are provided with similar reference symbols, but with a "1", "2" or "3" in front.

Figure 8:
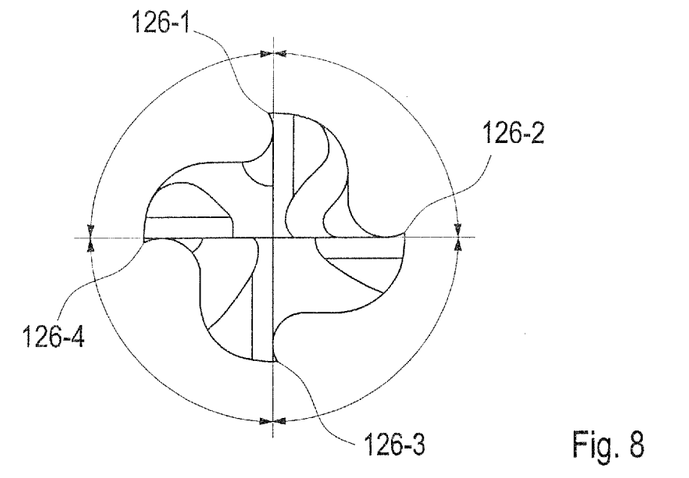
FIG. 8 shows the end view of a modified embodiment of the shank cutter, in which equal pitch is present on the end face.

FIG. 8 schematically shows the end view of a modified embodiment of the shank cutter. In this variant the arrangement is such that an equal pitch of the circumferential cutting edges 126-1 to 126-4 is present on the cutter end. In other words, the plane of section V-V in FIG. 3 is at the cutter end in this variant.

Figure 9:
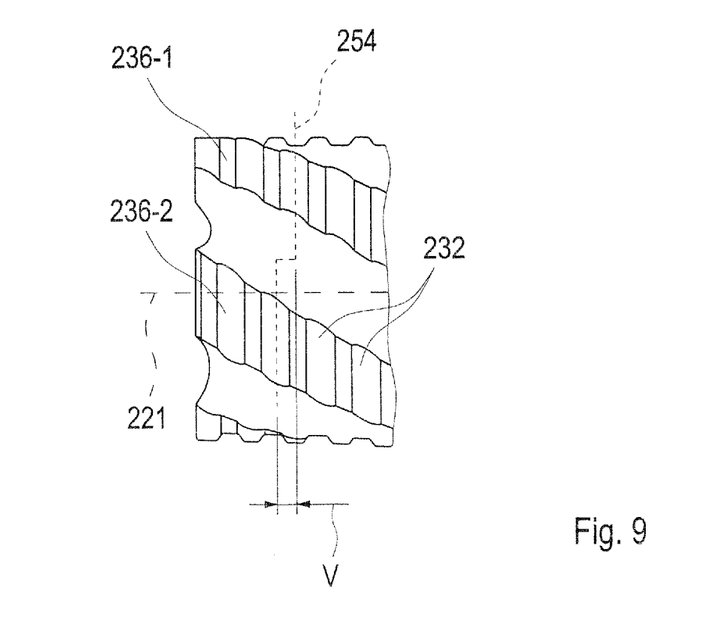
FIG. 9 shows a detailed view of a circumferential surface of a modified exemplary embodiment of the shank cutter.

FIG. 9 shows a modified embodiment of the shank cutter, in which the chip-separating grooves which are referred to with 232 are oriented slightly differently than in the above-described exemplary embodiment. As can be seen in FIG. 9, the chip-separating grooves 232 run parallel to a normal plane to the cutter axis 221. The dashed line 254 indicates that chip-separating grooves are offset by a dimension V by cutter ridges 236-1 and 236-2 which are adjacent in the circumferential direction, where:

$$V=T/n,$$

where T means the pitch of the roughing profile (cf. FIG. 2) and n means the number of circumferential cutting edges 226-1 to 226-n.

The above-described structure produces a shank cutter which is suitable in particular for machining materials which are difficult to chip while providing large cutting widths, that is, a shank cutter in particular for cutting flanks, grooves, diagonal drill holes or spiral shapes. It is indicated using FIG. 10 how chip formation takes place with the shank cutter according to the invention. VPU refers to the feed rate per revolution of the shank cutter. T is the pitch of the roughing profile. V1 to V4 refer to the axial offset of the circumferential cutting edges which are adjacent to flattened sections 34 of the roughing profile. The equal or unequal pitch of the circumferential cutting edges (cf. FIG. 6) which is present in the respective axial plane defines the sequence in which the teeth of the relevant roughing profile of the circumferential cutting edges are engaged and how the chipping thickness changes. For example, the size of the chipping thickness DS1 is slightly less than the size of the subsequent chipping thicknesses DS2 if the circumferential distance between the circumferential cutting edges which are engaged one after the other is greater than the previous circumferential distance.

Figure 10:
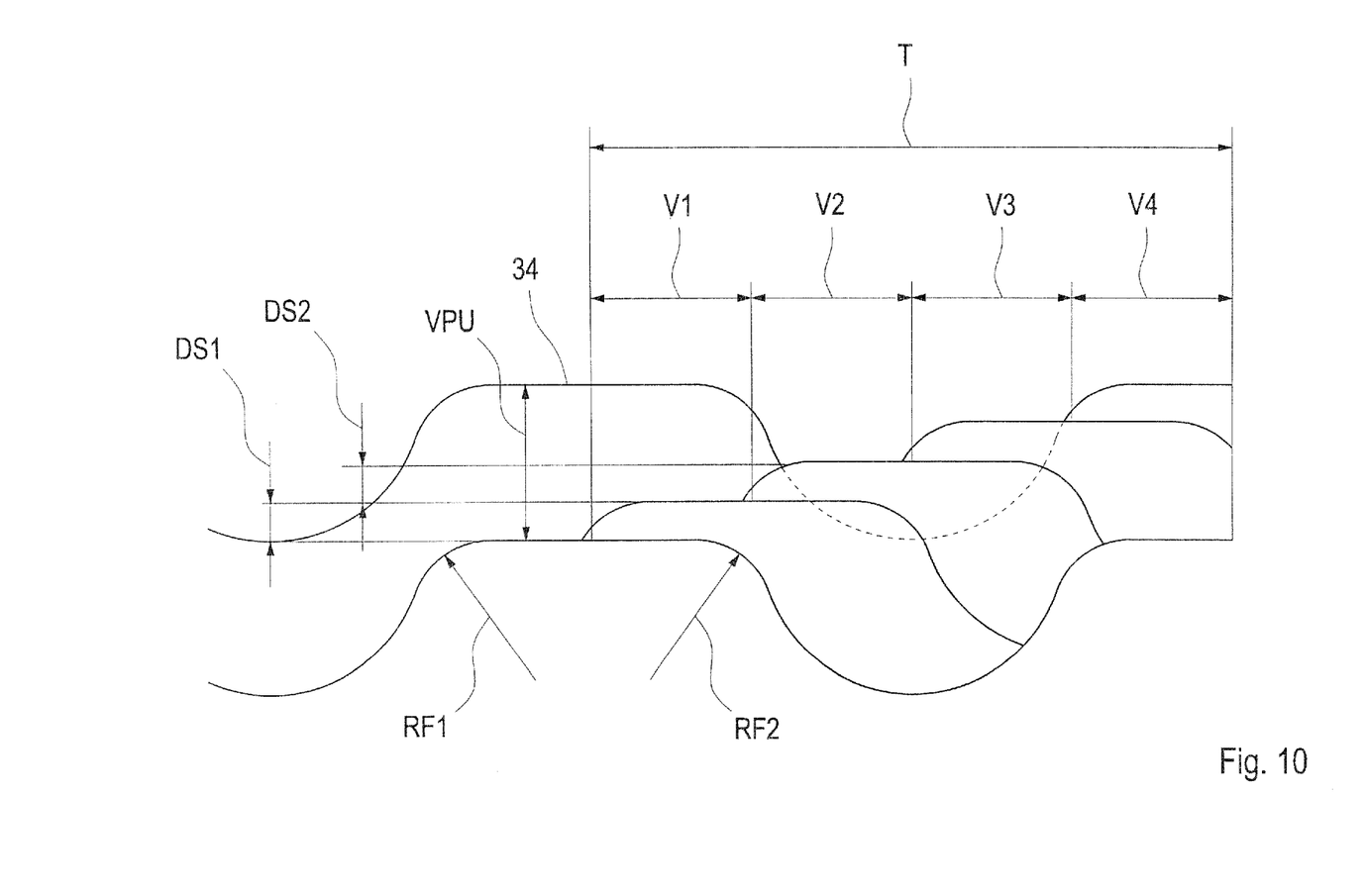
FIG. 10 shows a schematic diagram to illustrate the chip formation of adjacent circumferential cutting edges.

It is apparent from this illustration that these multiple irregularities in chip formation, which change again over the axial length of the shank cutter, counteract the risk of tool instability caused by self-oscillation. The shank cutter according to the invention therefore not only operates at an optimum material removal rate, but also in such a manner that a very good workpiece surface can be realised even with large cutting widths and a good service life.

This advantageous effect can be enhanced further by suitable material choice in the structure of the shank cutter. According to an advantageous development, the whole shank cutter consists of a hard material, in particular from solid hard metal, as a result of which improved rigidity and an even lower susceptibility to vibration is produced. The service life of the shank cutter can be further optimised by suitable coatings.

The geometry of the roughing profile, in particular the ratio of the pitch to the axial length of the flattened section and/or the ratio of the pitch to the depth of the chip-separating groove is preferably selected as a function of the physical characteristics of the material to be chipped.

In all the above-described embodiments, the roughing profile is equipped with a completely flattened central section 34. This geometry is however not absolutely necessary to achieve the advantages according to the invention to a critical extent. The central section can also be rounded, preferably slightly bulged or convex, which will be explained in more detail below using FIG. 11.

Figure 11:
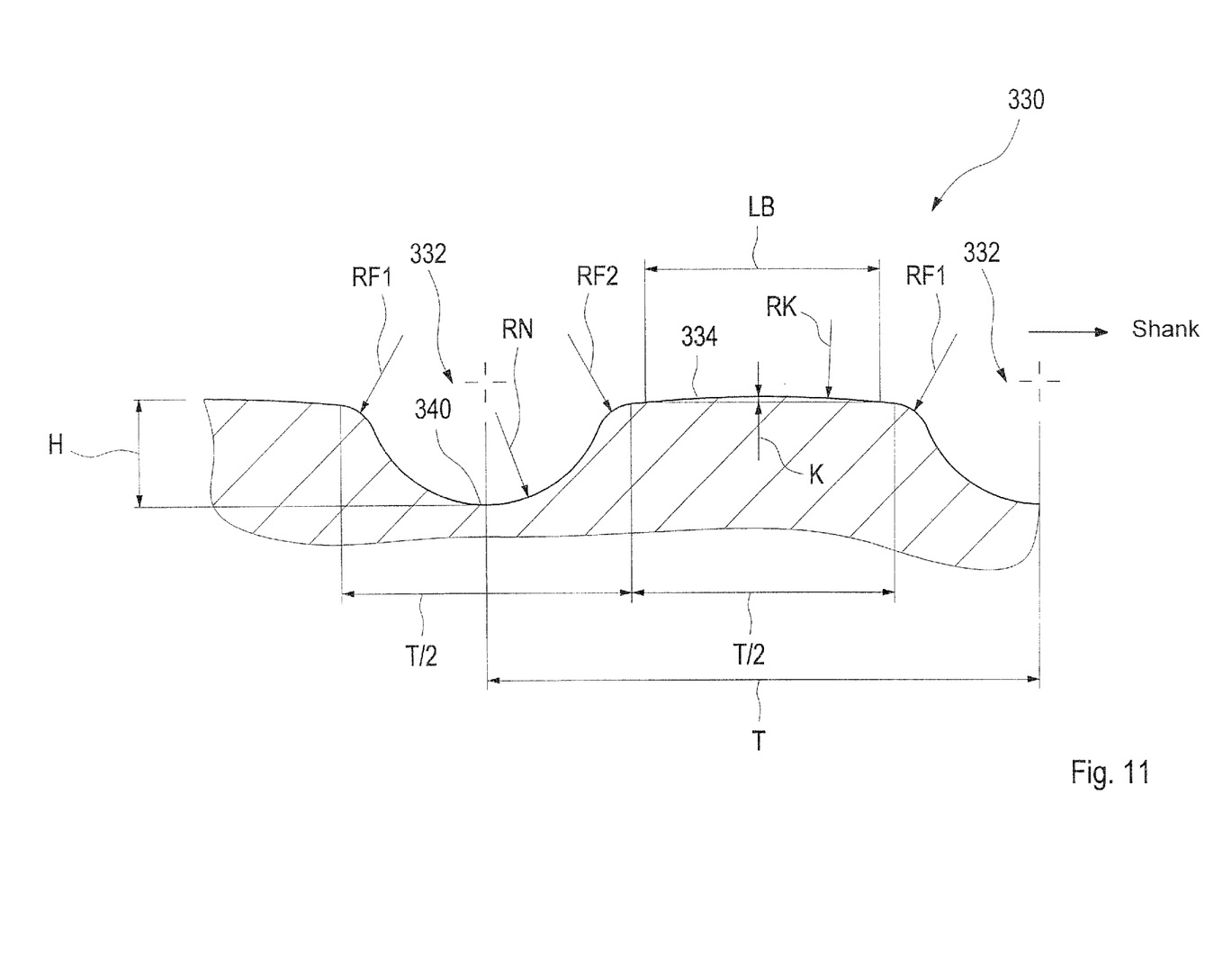
FIG. 11 shows a modified roughing profile in an enlarged illustration.

In this roughing profile 330 too, the individual chip-separating grooves 332 have a rounded. groove base 340 with an extremely small groove radius RN. The chip-separating groove 332 merges into a slightly convex but still essentially flattened central section 334 by means of a first flank radius RF1. The flank radius RF1 is on the side of the chip-separating groove 332 which faces away from the cutter shank. On the side which faces the cutter shank, the respective chip-separating groove 332 merges into the central section 334 of the roughing profile by means of a second flank radius RF2. The pitch of the roughing profile, that is, the axial distance between adjacent chip-separating grooves 332 of a circumferential cutting edge, is again referred to with T and the depth of the roughing profile 30 is referred to with H.

The values RF1, RF2, T and H, and thus also the axial dimension LB of the essentially flattened but convex section 334 are again variable in order to carry out an adaptation to the chipping conditions, that is, to the material to be chipped, to the cutting speed and to the material removal rate. The following also applies with this embodiment:

1. The flank radius RF1 and RF2 should be in the range from 0.1 to 1 mm;
2. The size of the smallest radius RN in the base 340 of the chip-separating groove 332 should be greater than the flank radius RF1 or RF2;
3. The flank radius RF2, which leads during cutting in the direction of rotation, that is, in the cutting direction, of the shank cutter which has a right-handed twist in the embodiment according to FIG. 1, that is, the flank radius RF2, which faces the cutter shank, of the chip-separating groove, should be greater than the flank radius RF1 which faces away from the cutter shank. In other words, the flank radius which first does the cutting work when the roughing profile penetrates the workpiece should be greater than the other flank radius.

In the exemplary embodiment of FIG. 11, the contour of the roughing profile can be formed by four circular line sections. The section with RF1 is connected to the section with RN, to this the section with RF2 and to this the section with the radius RK, which can be in the region of the size of the groove radius RN but also bigger than this, preferably by a multiple. The central section 334 can also—differing from a circular line—be formed by another curve.

The convexity K of the profile is preferably low in the region of the central section 334. The following preferably applies, with reference to FIG. 11:

$$K:LB \leq 0.5, \text{ particularly preferably}$$

$$K:LB \leq 0.05.$$

where the dimension LB refers to the profile length between the flank radii RF1 and RF2.

Of course, deviations from the described exemplary embodiment are possible without departing from the basic idea of the invention.

The cutting part can for example be configured with other, conventional cutting edge geometries.

It is also possible to equip the tool with an internal coolant/lubricant supply system.

Furthermore, the angle of twist of the individual circumferential cutting edges can change either continuously or discontinuously over the axial length of the shank cutter.

Cutting inserts can also be used instead of cutting edges which are formed in one piece with the shank cutter material.

It is furthermore possible to change the end geometry of the cutter within wide limits. The cutting parts can be configured to be rectangular, with corner chamfer or ball end.

The roughing profile can also have an unequal pitch in the individual circumferential cutting edges, that is, irregularly over the axial length. It is also possible to change the cross section of the chip-separating grooves in the circumferential direction.

Finally, a different profile can be formed on the different cutter ridges. It is also possible to expose individual circumferential cutting edges or diametrical pairs of cutting edges of the circumferential cutting edges. In other words: A modification can be made in such a manner that, in the case of 4 circumferential cutting edges, cutting edges 1 and 3 are equipped with a roughing profile, whereas cutting edges 2 and 4 are smooth.

The invention thus creates a shank cutter which has a plurality of circumferential cutting edges which run in a helical manner in the region of its cutting section and of which at least one critical number are equipped in each case with a preferably essentially flattened roughing profile with chip-separating grooves with rounded bases, in such a manner that the chip-separating grooves of cutter ridges which are adjacent in the circumferential direction are axially offset with respect to each other. In order to create a tool which is characterised by a long service life by the combined advantages of a vibration-stabilised finishing cutter and a conventional roughing cutter, at least one circumferential cutting edge has an angle of twist which differs from the angle of twist of another circumferential cutting edge. In addition, the chip-separating grooves of the circumferential cutting edges which are equipped with a roughing profile in each case merge into a preferably essentially flattened central section of the roughing profile by means of a predefined flank radius.

The invention claimed is:

1. An end mill cutter, comprising:
   a cutting section; and
   a plurality and even number of peripheral cutting edges which run in a helical manner in a region of the cutting section,
   at least two cutting edges each being equipped with a flattened roughing profile,
   each flattened roughing profile having chip-separating grooves with rounded bases,
   the chip-separating grooves of a first cutter ridge being axially offset from the chip-separating grooves of a second cutter ridge, the second cutter ridge adjacent to the first cutter ridge in a peripheral direction,
   at least one of the peripheral cutting edges having an angle of twist which differs from an angle of twist of another one of the peripheral cutting edges,
   angles of twist of adjacent peripheral cutting edges differing by from 1 degree to 6 degrees,
   each peripheral cutting edge lying diametrically opposite to, and having a similar angle of twist as, another peripheral cutting edge,
   the pitch of the end mill cutter equal in a radial plane lying in the region of the cutting section perpendicular to a cutter axis, and
   each chip-separating groove merging into a substantially flattened central section of the roughing profile by means of a predefined flank radius.

2. An end mill cutter according to claim 1, wherein the flank radius lies in the range from 0.1 to 1.0 mm.

3. An end mill cutter according to claim 1, wherein the flank radius which in each case faces away from the cutter shank is smaller than the other flank radius of the chip-separating groove.

4. An end mill cutter according to claim 1, wherein the chip-separating grooves are angled towards a plane, which is perpendicular to a longitudinal axis of the end mill cutter.

5. An end mill cutter according to claim 4, wherein the chip-separating grooves in each case follow in sections the course of a helix, the lead of which corresponds to the pitch of the roughing profile which is formed with the chip-separating groove.

6. An end mill cutter according to claim 1, wherein the chip-separating grooves are parallel with a plane which is perpendicular to a longitudinal axis of the end mill cutter.

7. An end mill cutter according to claim 6, wherein the chip-separating grooves of a first cutter ridge are axially offset by a dimension V with respect to the chip-separating grooves of a second cutter ridge that is adjacent in the circumferential direction, where:

$$V = T/n$$

and T means the pitch of the roughing profile which is formed by the chip-separating grooves and n means the number of peripheral cutting edges.

8. An end mill cutter according to claim 1, wherein the flank radius is smaller than the smallest radius in the base of the rounded chip-separating grooves.

9. An end mill cutter according to claim 1, wherein the angles of twist are between 20 and 55°.

10. An end mill cutter according to claim 1, wherein the end mill cutter consists of a hard material, at least in the region of the cutting section.

11. An end mill cutter according to claim 1, wherein the end mill cutter is provided with a coating, at least in the region of the cutting section.

12. An end mill cutter according to claim 1, wherein the geometry of the roughing profile and/or the ratio of the pitch of the roughing profile to the depth of the roughing profile is selected as a function of the physical properties of the material to be chipped.

13. An end mill cutter according to claim 1, wherein the roughing profile is essentially identical in all the sectional planes which contain a longitudinal axis of the end mill cutter.

14. An end mill cutter according to claim 1, wherein the central section which lies between the chip-separating grooves has a convexly curved surface.

15. An end mill cutter according to claim 14, wherein the radius of curvature of the central section is essentially greater than the flank radius.

16. A cutting method, comprising contacting a workpiece with an end mill cutter according to claim 1, and rotating the end mill cutter to chip a large cutting width in the workpiece.

17. An end mill cutter according to claim 1, where the roughing profile is equipped with a flattened central section.

18. An end mill cutter according to claim 1, wherein at least four chip-separating grooves of a single cutter ridge are equally spaced apart.

19. An end mill cutter according to claim 1, wherein the chip-separating grooves of the first cutter ridge are non-aligned with the chip-separating grooves of the second cutter ridge.

* * * * *